United States Patent [19]

Coutelle et al.

[11] Patent Number: 5,423,911
[45] Date of Patent: Jun. 13, 1995

[54] COATING PIGMENT FOR CELLULOSE-BASED PRINTING MEDIA

[75] Inventors: Helmut Coutelle, Freising; Joachim Hlavatsch, Ottobrunn; Friedrich Ruf, Tiefenbach; Hartmann Schott, Mauern, all of Germany

[73] Assignee: Sud-Chemie A.G. Aktiengesellschaft, Germany

[21] Appl. No.: 67,287

[22] Filed: May 25, 1993

[30] Foreign Application Priority Data

May 29, 1992 [DE] Germany .................. 42 17 779.0

[51] Int. Cl.$^6$ ............................................. C04B 14/20
[52] U.S. Cl. .................. 106/416; 106/20 R; 106/468; 106/486; 501/146; 501/147; 501/149
[58] Field of Search ............... 106/20 R, 416, 468, 106/486; 501/149, 147, 146

[56] References Cited

U.S. PATENT DOCUMENTS

| | | | |
|---|---|---|---|
| 3,433,704 | 3/1969 | Mecklan et al. | 162/181 |
| 3,909,454 | 9/1975 | Azrad | 252/455 |
| 4,022,735 | 5/1977 | Thompson | 106/468 |
| 4,336,306 | 6/1982 | Fellows | 427/121 |
| 4,549,930 | 10/1985 | Dessauer | 162/134 |
| 4,569,923 | 2/1986 | Knudson, Jr. et al. | 106/468 |
| 4,737,306 | 4/1988 | Wichelhaus et al. | 252/95 |
| 4,789,595 | 12/1988 | Salinas et al. | 106/486 |
| 4,800,041 | 1/1989 | Tymon et al. | 252/378 R |
| 4,804,416 | 2/1989 | Jepson et al. | 106/468 |
| 4,867,844 | 9/1989 | Dessauer | 162/135 |
| 4,911,482 | 3/1990 | Rice | 106/486 |
| 4,943,324 | 7/1990 | Bundy et al. | 106/486 |
| 4,948,664 | 8/1990 | Brociner | 106/486 |

FOREIGN PATENT DOCUMENTS

| | | |
|---|---|---|
| 26075 | 4/1981 | European Pat. Off. . |
| 0283300 | 9/1988 | European Pat. Off. ...... D21M 1/22 |
| 489422 | 6/1992 | European Pat. Off. . |
| 3036551 | 1/1987 | Germany . |
| 4308886 | 6/1992 | Germany . |

OTHER PUBLICATIONS

Derwent Abstract, Cited Patent DE 4038886, no date.
Derwent Abstract, Cited Patent DE 3149131, no date.
Derwent Abstract, Cited Patent 3036551, no date.

Primary Examiner—Mark L. Bell
Assistant Examiner—Scott L. Hertzog
Attorney, Agent, or Firm—Scott R. Cox

[57] ABSTRACT

A coating pigment for coating printing media, especially paper and cardboard, is made with at least one swellable layer silicate which can be fixed on the printing medium essentially without binders, where the amount of swellable layer silicate is at least 30 weight percent and the swelling volume of the coating pigment is 5 to 30 ml, based on suspension of 2 g coating pigment in 100 ml water. A water-based coating which contains such a coating pigment and a printing medium that is coated on one or both sides with the coating pigment or coating are also described. The deinkability of printed printing media coated with the coating pigment is improved.

26 Claims, No Drawings

COATING PIGMENT FOR CELLULOSE - BASED PRINTING MEDIA

BACKGROUND OF THE INVENTION

The field of art to which this invention pertains is pigments used in the coating of cellulose-based printing media.

Coating pigments based on swellable smectic clays are known from European Patent Application No. 283,300. In addition to smectic clays, such coating pigments can also contain up to 30 percent secondary pigments or extender pigments, such as kaolin or calcium carbonate. The amount of pigment applied is no more than 5 g/m$^2$, preferably no more than 1 g/m$^2$. An example of a smectic clay that can be used is naturally occurring sodium bentonite (Wyoming bentonite). However, this clay has a swelling capacity of 50 ml (2 g in 100 ml water). Despite its high swelling capacity, its adhesion to paper is very poor without a binder which is why printability by the offset printing method (water contact) is problematical. The use of European bentonites with exchangeable sodium and calcium ions has also been described. However, coatings produced with these bentonites also exhibit poor adhesion to the paper surface in the absence of binders. This effect is manifested especially by the phenomenon of "missing dots." Otherwise, these layer silicates and the use conditions are not defined in greater detail. Since these bentonites are natural products, the properties vary considerably, which is manifested especially by very poor handling in production and fluctuations in the capacity of the shine- and strike-through of the printing inks. In the case of sodium bentonites, the high swelling volume and thus the high viscosity prevent the application of the coating pigment under normal operating conditions (see also *Tappi Journal*, May, 1992, pages 231 to 237; *Das Papier*, Volume 16, 1992, pages 273 to 277). Papers coated with these pigments have a low pick resistance. Binders, such as starch or latex are added in almost all examples in order to improve adhesion to the paper fiber. A synergistic effect is also observed. These binders make surface finishing more expensive and also interfere with recycling and deinking of paper in reprocessing. They also increase the COD value of the processing water which is generally recycled, which in turn leads to increased susceptibility to problems in paper production (runnability). Thus there may be sticking to felts, wires, etc., or holes in the paper. In addition, the pigment coating and printing ink are fixed on the fiber in such a way that separation of the printing ink can be accomplished only with the help of large quantities of chemicals or it is associated with a great loss of fiber or a loss of whiteness.

German Patent 736,450 describes a process for production of coated paper using a coating composition that contains a binder and pigment wherein bentonite or a similar swelling clay is used as the binder in the coating compound. However, the material used in this process is not characterized further. Binders are normally used in amounts on the order of 15 to 25 percent so the bentonite content according to this patent would be in the same range. Furthermore, fixation of the pigments with the help of the inorganic binder of bentonite is not proven and the addition of conventional binders is mentioned.

German Patent Application 4,038,886 discloses water-based organophilic layer silicates based on bentonite for coating paper. The organophilic layer silicates are obtained by reacting sodium bentonite with quaternary ammonium salts in a ratio of 69:31. European Patent Application 192,252 describes a similar organophilic bentonite and its use in coating compositions based on organic solvents. Neither case, however, involves modification of the surface of the sodium bentonite in the sense of alternating the zeta potential but instead these two prior art documents concern processes for rendering the bentonite completely hydrophobic. Therefore these pigments can be processed to water-based coatings only by using additional organic wetting agents.

A similar reaction (layer silicates based on vermiculite and/or mica) with alkylammonium compounds is disclosed in German Patent 3,636,850. Films can be produced from aqueous suspensions of these organophilic silicates. However, these materials are completely unsuitable for the purpose of the present invention.

According to U.S. Pat. No. 4,943,324, paper fillers are obtained by treating the surfaces of kaolin pigments with an amine. The purpose of this invention is to prevent loss of strength between the paper fibers that occurs when using inorganic fillers.

Finally, U.S. Pat. No. 3,508,952 describes pretreatment of layer silicates with chromium salts and/or zirconium salts to reduce the gas permeability of cellulose-based substrates.

The object of this invention is to provide coating pigments for cellulose-based printing media that will impart improved printability, lower ink strike-through and better print opacity to the coated printing media. In particular, the coating pigments are suitable for application by modern coating equipment at high speeds, and a low coating weight is sufficient to achieve the desired effects (printability) so as to guarantee the possibility of producing paper of LWC and ULWC grades, for example, with a greatly reduced grammage (weight of sheet of paper in grams per square meter). Furthermore, this invention is directed to the problem of providing printing media that can be deinked easily and thus is "more environmentally friendly" than the printing media available in the past.

SUMMARY OF THE INVENTION

This invention is directed to coating pigments for cellulose-based printing media, such as paper and cardboard. In one aspect, this invention pertains to coating pigments which contain at least one swellable layer silicate. In another aspect, this invention relates to water-based coatings containing the coating pigments. In yet another aspect, the invention pertains to a process for coating a cellulose-based printing media and the printed media obtained therefrom. Finally, this invention relates to a process for improving the deinkability of printed printing media.

The coating pigment of this invention which can be fixed on printing media, e.g., paper and cardboard, essentially without the use of organic binders, is at least one swellable layer silicate in the amount of at least 30 weight percent based on the weight of the pigment, wherein the swelling volume of the coating pigment is about 5 to about 30 ml, based on a suspension of 2 g coating pigment in 100 ml of water.

The water-based coating composition of this invention contains about 5 to about 50 weight percent, based on the weight of the coating, of the coating pigment described hereinabove. The water-based coating composition is applied to the printing media at a rate of 500 to 2000 meters/minute. The printing media, e.g., paper or cardboard, has a weight of at least 20 g/m², and is coated on one or both sides with the water-based coating in such amounts that the weight of coating pigment is about 0.5 to about 6 g/m² per side. Printed printing media of this invention can be readily deinked.

The coating pigment of this invention can be fixed on the fiber of printing media even without organic binders using modern printing conditions, such as high printing speeds, printing inks that cause picking, and high moisture content (for example, in offset printing, etc.) It is surprising that even under such conditions, no dusting or powdering of the pigment coating occurs during the printing of the paper and that the resulting printed paper can be readily deinked.

DESCRIPTION OF THE INVENTION

The coating pigments of this invention, which can be fixed on the printing medium essentially without the use of organic binders, contain at least one swellable layer silicate in the amount of at least 30 weight percent based on the weight of the coating pigment. The swelling volume of the coating pigment is about 5 to about 30 ml, preferably about 8 to about 30 ml, based on a suspension of 2 g coating pigment in 100 ml water.

The swelling volume of the coating pigment is determined according to the following method: on the water surface of an upright graduated cylinder filled with 10 ml of distilled water, place 2 g of pigment slowly and by portions using a spatula. Wait until the first portion has settled to the bottom before adding the second portion. After 2 g of pigment have dropped completely to the bottom of the cylinder, wait one hour and then read the amount of swollen substance on the graduations. State the results in ml/2 g.

If the swollen volume of the coating pigment that contains a swellable layer silicate is greater than 30 ml, the viscosity of the coating composition produced with it will increase to the extent that this coating composition can no longer be applied with normal modern coating equipment. In principle, the coating composition can be diluted to reduce the solids content in order to adjust it to the required viscosity, but this leads to other disadvantages. The use of low solids coatings increases the moisture content in the paper during the coating process. This causes an enormous increase in the incidence of tearing, so that only extremely strong water-resistant papers can be used. Such papers are normally characterized by a high grammage and good printability. It is the very thin papers that tear extremely rapidly when loaded with water. Such papers with a grammage of 20 to 40 g/m² cannot be used with coating compositions that have low solids content. Furthermore, the drying zones required for drying paper coated with a low solids content coating composition are not normally available in standard paper machines. Such paper machines can hardly be retrofitted for this purpose due to the lack of available space.

If the viscosity of the coating composition is too high or the solids content is too low, it is difficult to control the desired coating weight, so the desired coatings of preferably 1.1 to 3.0 g/m³ per side cannot be applied. If the swelling volume is lower than the range specified according to this invention, coating compositions with a higher solids content and a viscosity that can still be processed well can be produced but adhesion of the pigment to the paper suffers greatly. This is due to the fact that the swellable layer silicate is then only incompletely dispersed and is not in a delaminated form consisting of individual lamellae and it can no longer fully manifest its effect as a binder.

So far, the possibility of using such pigments has failed due to this contradiction between the requirements of high swelling volume and good effect (but unusable viscosity) on the one hand and low swelling volume and high solids content (but poor effect) on the other hand.

With the stated swelling volumes, the viscosity of the coatings produced from the coating pigments is still relatively low even when the pigment content is high. However, a surprisingly good adhesion of the coating to the printing medium is achieved within this range.

The swellable layer silicate used in the coating pigment of this invention has a pH of 7 to 12, preferably 8.5 to 10.5, in the form of a 2 weight percent dispersion in water at 20° C. The pH can be determined by means of a pH meter (glass electrode) according to DIN 53,200.

A swellable layer silicate with a BET surface area of 20 to 120 m²/g, preferably 30 to 80 m²/g, is used. The BET surface area is determined by the adsorption method with nitrogen according to DIN 66,132.

In general, the swellable layer silicate in the coating pigment will have a zeta potential of $-35$ to $+10$ mV. The zeta potential is preferably between $-30$ and $-5$ mV and is determined according to the electrophoresis method with the help of a "Laser Zee Meter 501" from the company Pem Chem in 0.1 percent suspension.

Mainly minerals of the smectic group such as bentonite, montmorillonite, hectorite, saponite or nontronite are used as the swellable layer silicates. Natural and synthetic layer silicates such as synthetic hectorite can also be used.

For reasons of availability, bentonite is preferred. Both natural sodium bentonites and calcium bentonites can be used.

In general, all the swellable layer silicates that are used are subjected to a pretreatment in order to remove foreign substances such as sand, feldspar and other hard impurities (referred to below as "grit"). This cleaning is preferably accomplished with the help of grinding and sorting equipment or according to other standard methods conventionally used in the mineral processing industry.

The amount of swellable layer silicates preferably amounts to at least 40 weight percent, especially at least 50 weight percent, up to 100 weight percent, of the coating pigment. The coating pigments according to this invention can also contain extender pigments in addition to the swellable layer silicate. Preferably 31 to 70 weight percent of an extender pigment such as delaminated kaolin, calcined kaolin, natural or precipitated calcium carbonate, aluminum hydroxide, titanium dioxide or some other coating pigment that is suitable for coating paper is used. If bentonite, for example, is used as the starting material for the swellable layer silicate, then naturally occurring alkali bentonites, especially sodium bentonites, can be used because they impart the required swelling volume to the coating pigments.

European bentonites which have a higher exchangeable alkaline earth ion content, especially a high calcium ion content, do not achieve the required swelling volume without the use of extender pigments and therefore must be subjected to an activation treatment with suitable alkali compounds. Examples of compounds that are suitable for this alkaline activation include sodium bicarbonate, sodium phosphates, sodium zeolite, etc. In principle other alkali compounds are also suitable for achieving the desired properties. Swellable natural sodium bentonites may also be adjusted to the desired swelling volume and viscosity by means of an appropriate activation treatment—for example, by activation with calcium compounds such as calcium carbonate, etc. In this way, it is possible to lower an excessively high swelling power of the laminar silicate and adjust the swelling power of the coating pigment to the range according to this invention. Under some circumstances, a simple mechanical activation without the use of chemicals will be sufficient to produce coating pigments according to this invention.

With the help of the coating pigments according to this invention, paper or other printing media with a low grammage, such as catalog paper, may also be coated, in which case good printability is achieved even with a low grammage and the printing ink does not strike through.

Such papers have been produced in the past by coating with conventional coating pigments which must be fixed with the use of organic binders, in which case a coating weight of about 5 to 15 $g/m^2$ per side is normal. Papers coated with the coating pigment according to this invention make it possible to produce comparably printable papers even when the coating is applied in the amount of 0.5 to 6.0 $g/m^2$ per side, preferably 0.5 to 3.0 $g/m^2$ per side. Surprisingly, it has also been found that papers produced by this method can also be printed by the gravure printing method as well as the offset printing method. The papers produced according to this invention can also be deinked well.

The reason why all the desired paper properties are obtained through the choice of the properties of the coating pigments according to this invention is not known exactly. Coating pigments with the stated swelling volume have the coating viscosity and solids concentration that are suitable for yielding a homogeneous coating with the help of conventional modern methods of application. The BET surface area and the pH are also parameters that influence the processing properties of coating compositions produced with the coating pigment according to this invention and also influence the printability of the printing media coated with these coatings.

The stated zeta potential ranges that may optionally be adjusted with the help of a cationic agent (up to 4 weight percent, preferably 0.5 to 2.0 weight percent) make it possible to optimize the contradictory requirements of good printability (and thus good fixation of the coating on the fiber structure) and easy deinkability (and thus facilitated release of the printing ink and coating from the paper surface). Although it is difficult to fix a coating pigment that has a more negative zeta potential than $-35$ mV on the fiber which itself has a negative charge, the coating pigments according to this invention with a zeta potential between $-35$ mV and $+10$ mV have adequate adhesion and yield paper with good printability and good pick resistance. Coating pigments having a zeta potential higher than $+10$ mV will adhere very well to the fiber for electrostatic reasons but they are very difficult to remove by deinking. The possibility of achieving a homogeneous coating even at the required low coating weight is also limited when working with coating pigments having a zeta potential of more than $+10$ mV because these pigments tend to produce clouds and thus yield an irregular coating. The good deinkability of the printing media produced according to this invention can presumably be attributed to the fact that in the usual deinking processes the printing ink is released from the paper surface together with the coating pigment.

In exceptional cases the coating pigments according to this invention will have a zeta potential outside the aforementioned range. In the normal case, the pigments are then more negative then indicated. However, the desired range can be achieved by adding a cationic agent, preferably to the swellable layer silicate. The cationic agents may be any of the usual agents such as polydiallyldimethylammonium chloride (poly-DAD-MAC), cationic carbohydrates such as cationic starch, guar, etc. Other quaternary ammonium compounds can also be used. Cationic agents that do not act as binders and can alter the properties of the coating are preferred.

This invention also concerns a water-based coating composition that contains a coating pigment as defined above in a concentration of 5 to 50 weight percent, preferably 16 to 50 weight percent, especially 21 to 40 weight percent, plus optionally a dispersing aid.

Preferably the water-based coating composition will have a viscosity of up to about 2000 mPa s, especially 100 to 2000 mPas.

Examples of suitable dispersing aids include polyacrylates, polyphosphates or other conventional dispersion aids. The coating compositions according to this invention adhere surprisingly well to the printing medium even without the use of binders.

The pH of the coating composition is preferably about 7 to 12, especially about 8.5 to 10.5.

This invention also concerns a process for coating a printing medium with a water-based coating composition as defined above. This process is characterized in that the coating composition is applied at the rate of 500 to 2000 m/min to the printing medium.

This invention also concerns a printing medium, especially paper or cardboard, that is coated on one or both sides with the coating pigment or coating composition defined above. Preferably the grammage is at least 20 $g/m^2$, preferably about 20 to about 40 $g/m^2$, most preferably about 25 to 38 $g/m^2$. The weight of the coating pigment is about 0.5 to 6.0 $g/m^2$ per side, preferably about 1.1 to 3.0 $g/m^2$ per side. The printing medium is characterized in that it can be printed by both gravure and offset printing methods and furthermore it can also be deinked easily. The coated printing medium is subjected to a supercalendering or soft calendering process after being coated, but soft calendering is preferred.

This invention also concerns a process for improving the deinkability of printed printing media, especially paper and cardboard, and is characterized in that it starts with a printing medium that is coated on one or both sides with a coating pigment that is fixed essentially without the use of binders and contains at least one swellable smectic layer silicate, where the amount of swellable layer silicate is at least 30 weight percent and the swelling volume of the coating pigment is 5 to 30 ml, and the printing medium coated in this way is subjected to a conventional deinking process.

It is preferably to start with a printed printing medium that contains at least 1 g coating pigment per $m^2$ per side, preferably at least .15 $g/m^2$, where the printing ink is adsorbed essentially in the layer of coating pigment.

This invention is illustrated by the following examples in a manner that does not restrict the scope of the present invention.

EXAMPLE 1

A bentonite of Greek origin ("Ca/Mg bentonite") containing $Ca^{2+}$ and $Mg^{2+}$ at the interlattice sites was suspended in water to yield a 16 percent suspension and was freed of coarse impurities, the so-called grit, by cleaning it in a hydrocyclone. The grit-free material was then concentrated to a water content of 30 to 50 percent by vacuum filtration and activated with sodium carbonate in a twin-screw mixer for 5 minutes. The product was dried gently at 90° C. in a circulating air drying cabinet to yield a water content of about 10 weight percent and then was ground in a cross beater mill to a $d_{50}$ value (measured in a Malvern particle size of 2600 c) of 5 to 7 μm.

Most of the Ca and Ca/Mg bentonites of the following examples were processed in this way. The sodium bentonites were suspended in water to yield 2 percent suspensions and were purified by repeated sedimentation and decanting. They were concentrated by a combination of sedimentation and centrifugation. Activation, drying and milling were performed as described above.

The relevant data on the Greek bentonite activated with 1 percent sodium carbonate are summarized in Table I. These data were obtained by the following methods:

Swelling volume

Fill a calibrated 100 ml graduated cylinder with 100 ml distilled water. Slowly place 0.1 to 0.2 g portions of the substance to be measured on the surface of the water to a total of 2.0 g of the substance. After each portion of substance has settled out, add the next portion. After adding all the substance, wait one hour and then read the volume of a swollen substance in ml/2 g.

pH

Determine the pH by means of a glass electrode according to DIN ISO 7879.

Zeta potential

Measure the zeta potential according to the electrophoresis method using a "Laser Zee-Meter 501" from Pem Chem in 0.1 percent suspensions.

Specific surface area

This measurement is performed according to the BET method, following the procedure described in DIN 66,132.

Coating

The activated bentonite was processed by shearing for 5 minutes at 5000 rpm in an "Ultra-Turrax" to yield suspensions with a solids content of (a) 5 weight percent, (b) 10 weight percent, (c) 16 weight percent, (d) 22 weight percent and (e) 30 weight percent in water and then was applied manually by means of a doctor blade to 49 g/m² coated raw paper (Examples 1a to 1e) or was applied industrially using a gravure coater with a working width of 1250 mm at the rate of 550 m/min. The solids content here was 21 weight percent (Example 1f). The weight of the coating applied was determined by reweighing. The results are summarized in Table I.

Adhesion of coating

A 20 mm wide strip of adhesive tape ("Tesa" cellophane tape) was applied to a length of 15 cm of paper coated and equilibrated at a relative atmospheric humidity of 50 percent and then fixed for 30 seconds by applying a weight with a pressure of 50 kg/cm². After promptly pulling away the adhesive tape, the amount and distribution of the coating particles pulled away with the tape were evaluated visually. The following notation is used in the table:

+++ complete fixation of the coating; no coating particles detached;

− − − no adhesion of the coating, complete separation of particles.

Printability

The coated paper was printed in an RK laboratory gravure printing machine from Print Coat instrument Ltd./UK with a nap depth of 0.4 to 1.2 μm (printed with black gravure ink from Kast and Ehinger GmbH). The printing results were evaluated visually using the half-tone area (nap depth 0.8 μm) to evaluate the print quality and the full-tone area (nap depth 1.2 μm) to evaluate the strike-through and shine-through of the printing ink.

The following notation was used: +++ very good, clear print image with very little strike-through and shine-through on the back of the page; − − − very poor, irregular print image, severe strike-through and shine-through on the back of the page.

As shown by Tables Ia and Ib, the materials from Examples 1a to 1f met all the requirements according to this invention and yielded a coating that adhered well even without the use of binders and yielded excellent printing results despite the low application weight of the coating.

EXAMPLES 2 and 3 (comparison)

The bentonites activated with large quantities of sodium carbonate according to Examples 2 and 3 did not meet the requirements according to this invention with regard to swelling volume and thus had inferior adhesion of the coating and inferior printability accordingly. The zeta potential in Example 3 was also outside the preferred range. In addition, Examples 2 and 3 yielded a very high slurry viscosity with a high degree of thixotropy so the desired application weights could be achieved only be means of repeated application.

EXAMPLE 4

A calcium bentonite of Turkish origin was cleaned and activated by the method described in Example 1. Binder-free coatings with a pigment content of 20 weight percent were produced from this material. The coatings met all the parameters required of them according to the invention and had very good adhesion and good printability.

EXAMPLES 5 TO 7

Examples 5 to 7 show the possibility of producing coating pigments according to this invention by means of activation with alternative alkalies such as water glass 37/40, sodium aluminate and/or sodium sulfate (see Table Ib). The pigments according to Examples 5 to 7 could be processed well with a solids content of 25 percent and the coating yielded good adhesion and printability.

EXAMPLE 8 (comparison), EXAMPLES 9 TO 11 AND 12 (COMPARISON)

Calcium bentonite of Bavarian origin was cleaned as described in Example 1 and then activated with 0 percent, 1 percent, 2 percent, 3 percent or 6 percent sodium carbonate. Table I shows that the bentonite that was not treated with sodium carbonate (Example 8, comparison) had a swelling volume that was too low and the coating produced from it (pigment content 30 weight percent) had poor adhesion and poor printability. Examples 9 to 11 met the requirements according to this invention and the coatings produced from them had good printing results at all pigment concentrations. The values listed in Table Ib were obtained with a pigment concentration of 8 weight percent. Example 12 (comparison) yielded a swelling volume that was too high and a zeta potential that was too negative and thus it was not suitable for use as a coating pigment.

EXAMPLES 13 AND 14 (COMPARISON)

Sodium bentonite from Wyoming such as that used according to Example 3 of European Patent 283,300 was cleaned as described above by sedimentation and decanting. The resulting coating pigment was also activated with 1 percent sodium carbonate and then was outside the range specified according to this invention with regard to swelling volume and zeta potential. These pigments were very difficult to apply and yielded inadequate adhesion and printability.

EXAMPLE 15

A synthetic hectorite (Optigel SH by the present patent applicant) was prepared according to a method known from the literature from water glass, magnesium chloride and lithium chloride in a hydrothermal process. It was processed with 1 weight percent polyphosphate as a dispersion aid with a high solids content. Table Ib shows the results for a coating with a pigment content of 15 weight percent.

EXAMPLE 16 (COMPARISON)

Bavarian calcium bentonite was kneaded with 25 percent sulfuric acid after cleaning, thus increasing the specific surface area to 155 $m^2/g$. The product could not be fixed on the raw paper without the use of binders when working with a pigment concentration of 30 weight percent and therefore the paper could not be printed.

EXAMPLES 17 (COMPARISON) AND 18 TO 24

The examples summarized in Table II show that the activated bentonite from Comparative Example 3 can be converted to a coating pigment according to this invention by means of a suitable modification by cationic reagents. This results in a reduction in swelling volume. At the same time the zeta potential is adjusted to the range between $-35$ mV and $+10$ mV.

The reaction of the bentonite with the cationic reagents was performed in 5 percent water-based suspensions where a contact time of 15 minutes was always maintained. The suspension modified in this way could either be coated directly or the pigment was isolated by vacuum filtration, characterized and then processed to yield a coating with a pigment content of 25 weight percent.

In Example 17 (comparison), the bentonite was reacted with 0.5 percent of a dicyandiamide-formaldehyde condensate. The swelling volume was still too high. The zeta potential was $-36$ mV, which was also outside the preferred range. The pigment which was used as a coating with a pigment content of 5 weight percent was not suitable. In Examples 18 to 20, the swelling volume and zeta potential were adjusted to the correct range and thus the coatings produced with these materials (pigment content 25 weight percent) also yielded good printing results.

In Example 21 the swelling volume was at the lower limit. Furthermore, the pigment had a charge of $+16$ mV. The pigment was applied in the form of a coating with a pigment content of 25 percent and would adhere to paper but printability was relatively poor due to the cloudy structure of the coating.

Examples 22 to 24 show that different cationic reagents can be used successfully to reduce the swelling volume and achieve the desired zeta potential. Usable coating compositions (pigment content 20 weight percent) were obtained with the high polymer poly-DADMAC, the medium polymer polyethyleneimine and the monomer dimethyldistearylammonium chloride.

EXAMPLE 25

The unsuitable pigment from Comparative Example 13 could also be converted to a coating pigment that would yield coatings with good printing properties (pigment content 15 weight percent) by treating it with a dicyandiamide-formaldehyde condensate.

EXAMPLES 26 TO 29 AND 30 (COMPARISON)

The material according to this invention from Example 1 was blended with different amounts of coating kaolin and was processed to yield coatings with a solids content of 8 to 40 weight percent. The solids content was selected in such a way as to always yield a viscosity of about 500 mPa s (Brookfield 100 rpm) (solids contents: Example 26=15 weight percent; Example 27=20 weight percent; Example 28=30 weight percent; Example 29 30 weight percent) . The pigment mixtures were applied without the addition of binder to 49 $g/m^2$ raw paper with a doctor blade with a coating weight of about 2.5 $g/m^2$. According to Table III, good to adequate adhesion of the coating and good printability were achieved in Examples 26 to 29, where the swelling volume according to this invention was maintained. The material from Comparative Example 30, however (pigment content 30 weight percent), could not be fixed on the paper.

EXAMPLES 31 AND 32

In these examples, the pigment from Example 1 according to this invention was blended with $CaCO_3$ and $Al(OH)_3$ in a ratio of 50:50 in an aqueous suspension. The solids contents of the coatings were about 35 percent. These examples show that other known coating pigments can also be processed best in mixture with bentonite from Example 1.

EXAMPLE 33

The bentonite of Example 1 was applied at a speed of 550 m/min to raw paper with a grammage of 49 $g/m^2$ by applying a suspension with a solids content of 21 weight percent and without any added binder using a gravure coater with a working width of 1250 mm. The coating weight was 1.4 $g/m^2$. This paper could be printed with no problems by either the gravure method or—surprisingly—by offset printing.

The printing results were at least comparable to the results obtained on the same coating equipment with a coating applied in an amount of 3.5 $g/m^2$ with an LLWC coating consisting of coating kaolin (95 parts), acrylate binder (5 parts) and dispersant (0.5 part).

The coated paper was calendered in a soft compact calender (2+2 nip) at 130° C. at a rate of 470 m/min, printed with a black test printing ink by the gravure printing method and then deinked. In this test it was found that there was a considerable gain in terms of whiteness merely by pulping by the example of this invention.

|  | Raw paper | Example 33 | Kaolin LWC |
|---|---|---|---|
| Whiteness after pulping | 29.2% | 42.3% | 34.2% |

This shows the very good recyclability of the coating pigments according to this invention.

TABLE Ia

| Example 1 | Layer Silicate | Activation | with % | Solids % | Dispersant Type | % | Viscosity (Brookfield 100) mPa s |
|---|---|---|---|---|---|---|---|
| a | Ca/Mg bentonite Greek | Soda | 1 | 5 | Polyphosphate | 0.5 | 65 |
| b | Ca/Mg bentonite Greek | Soda | 1 | 10 | Polyphosphate | 0.5 | 190 |
| c | Ca/Mg bentonite Greek | Soda | 1 | 16 | Polyphosphate | 1.0 | 650 |
| d | Ca/Mg bentonite Greek | Soda | 1 | 22 | Polyphosphate | 1.0 | 1600 |
| e | Ca/Mg bentonite Greek | Soda | 1 | 30 | Polyphosphate | 1.5 | 2930 |
| f | Ca/Mg bentonite Greek | Soda | 1 | 21 | Polyphosphate | 1.0 | 1520 |

Soda = Sodium carbonate

TABLE Ib

| Example | Layer silicate | Activation | with % | Swelling volume ml/2g | pH | Zeta potential mV | Specific surface area $m^2/g$ | Application weight $g/m^2$ | Adhesion of coating | Printability |
|---|---|---|---|---|---|---|---|---|---|---|
| 1 a-f | Ca/Mg bentonite Greek | Soda | 1 | 22 | 9.5 | −28 | 65 | 1.6 | +++ | +++ |
| 2 | Ca/Mg bentonite Greek | Soda | 3 | 35 | 10.2 | −35 | 52 | 1.6 | + | + |
| 3 | Ca/Mg bentonite Greek | Soda | 5 | 55 | 11.4 | −46 | 44 | 1.8 | − | − |
| 4 | Ca bentonite Turkish | Soda | 3 | 16 | 9.8 | −30 | 42 | 1.6 | +++ | ++ |
| 5 | Ca bentonite Turkish | Water gl 37/40 | 8 | 12 | 10.0 | −32 | 38 | 1.8 | +++ | ++ |
| 6 | Ca bentonite Turkish | NaAlO$_2$ | 5.8 | 10 | 9.9 | −30 | 38 | 2.0 | +++ | ++ |
| 7 | Ca bentonite Turkish | Na$_2$SO$_4$ | 3 | 8 | 8.2 | −24 | 44 | 1.9 | ++ | ++ |
| 8 | Ca bentonite Bavarian | — | — | 4 | 7.5 | −22 | 72 | 1.9 | −− | −− |
| 9 | Ca bentonite Bavarian | Soda | 1 | 8 | 8.9 | −26 | 68 | 1.8 | ++ | ++ |
| 10 | Ca bentonite Bavarian | Soda | 2 | 19 | 9.5 | −28 | 62 | 1.8 | +++ | +++ |
| 11 | Ca bentonite Bavarian | Soda | 3 | 28 | 10.2 | −32 | 54 | 1.5 | +++ | +++ |
| 12 | Ca bentonite Bavarian | Soda | 6 | 40 | 11.3 | −39 | 41 | 1.6 | − | − |
| 13 | Sodium bentonite Wyoming | — | — | 50 | 10.0 | −40 | 68 | 1.5 | − | − |
| 14 | Sodium bentonite Wyoming | Soda | 1 | 58 | 10.8 | −43 | 64 | 1.6 | −− | −− |
| 15 | Hectorite, synthetic | — | — | 28 | 10.0 | −30 | 48 | 1.5 | +++ | ++ |
| 16 | Calcium bentonite Bavarian | H$_2$SO$_4$ | 25 | 4 | 3.5 | −20 | 155 | 1.8 | −−− | −−− |

Wasser gl = Water glass
Soda = Sodium carbonate

TABLE II

| Example | Layer silicate | Activation | with % | Swelling volume ml/2g | pH | Zeta potential mV | Coating weight $g/m^2$ | Adhesion of coating | Printability |
|---|---|---|---|---|---|---|---|---|---|
| 17 | Ca/Mg bentonite from Example 3 | Dicyandiamide-formaldehyde | 0.5 | 42 | 10.9 | −36 | 1.6 | − | − |
| 18 | Ca/Mg bentonite from Example 3 | Dicyandiamide-formaldehyde | 1 | 28 | 10.5 | −26 | 1.6 | ++ | +++ |
| 19 | Ca/Mg bentonite from Example 3 | Dicyandiamide-formaldehyde | 2 | 20 | 10.2 | −14 | 1.8 | ++ | +++ |
| 20 | Ca/Mg bentonite from Example 3 | Dicyandiamide-formaldehyde | 3.8 | 14 | 10.0 | +2 | 1.6 | ++ | ++ |

TABLE II-continued

| Example | Layer silicate | Activation | with % | Swelling volume ml/2g | pH | Zeta potential mV | Coating weight g/m² | Adhesion of coating | Printability |
|---|---|---|---|---|---|---|---|---|---|
| 21 | Ca/Mg bentonite from Example 3 | Dicyandiamide-formaldehyde | 5 | 5 | 9.8 | +16 | 1.8 | + | — |
| 22 | Ca/Mg bentonite from Example 3 | Poly-DADMAC | 0.5 | 30 | 10.8 | −24 | 1.5 | ++ | +++ |
| 23 | Ca/Mg bentonite from Example 3 | Polethyleneimine | 0.8 | 28 | 10.6 | −27 | 1.8 | ++ | ++ |
| 24 | Ca/Mg bentonite from Example 3 | Dimethyldistearyl ammonium chloride | 1.5 | 26 | 10.8 | −25 | 1.9 | ++ | ++ |
| 25 | Sodium bentonite Wyoming, from Example 13 | Dicyandiamide-formaldehyde | 1 | 26 | 9.6 | −22 | 1.4 | ++ | ++ |

TABLE III

| Example | Layer Type | silicate % | Extender Type | % | Swelling volume ml/2g | Coating weight g/m² | Adhesion of coating | Printability |
|---|---|---|---|---|---|---|---|---|
| 26 | Ca/Mg bentonite from Example 1 | 80 | No. 1 coating kaolin | 20 | 18 | 2.5 | +++ | +++ |
| 27 | Ca/Mg bentonite from Example 1 | 70 | No. 1 coating kaolin | 30 | 15 | 2.6 | +++ | +++ |
| 28 | Ca/Mg bentonite from Example 1 | 50 | No. 1 coating kaolin | 50 | 12 | 2.2 | ++ | ++ |
| 29 | Ca/Mg bentonite from Example 1 | 30 | No. 1 coating kaolin | 70 | 7 | 2.5 | + | ++ |
| 30 | Ca/Mg bentonite from Example 1 | 20 | No. 1 coating kaolin | 80 | 4 | 2.5 | − − | − |
| 31 | Ca/Mg bentonite from Example 1 | 50 | CaCo₃ coating quality | 50 | 10 | 2.2 | ++ | ++ |
| 32 | Ca/Mg bentonite from Example 1 | 50 | Al(OH)₃ | 50 | 14 | 2.4 | ++ | +++ |

What is claimed is:

1. A coating pigment that can be fixed on printing media without the use of organic binders comprising at least one water swellable layer silicate in the amount of at least 30 weight percent based on the weight of the pigment wherein said coating pigment has a swelling volume of about 5 to about 30 ml based on a suspension of 2 g of coating pigment in 100 ml water and wherein said water swellable layer silicate has a zeta potential value of about −35 to about +10 mV.

2. The coating pigment of claim 1 wherein a 2 weight percent dispersion of the water swellable layer silicate in water at 20° C. has a pH of about 7 to about 12.

3. The coating pigment of claim 2 wherein the pH is about 8.5 to about 10.5.

4. The coating pigment of claim 1 wherein the water swellable layer silicate has a BET surface area of about 20 to about 120 m²/g.

5. The coating pigment of claim 4 wherein the BET surface area is about 30 to about 80 m²/g.

6. The coating pigment of claim 1 wherein the water swellable layer silicate is present in the amount of about 30 to about 70 weight percent.

7. The coating pigment of claim 1 wherein the water swellable layer silicate is bentonite, montmorillonite, hectorite, nontronite, or saponite of natural or synthetic origin.

8. The coating pigment of claim 1 wherein one or more extender pigments are present in the amount of about 31 to about 70 weight percent.

9. The coating pigment of claim 8 wherein the extender pigment is kaolin, delaminated kaolin, calcined kaolin, natural or precipitated calcium carbonate, aluminum hydroxide, titanium dioxide, or mixtures thereof.

10. A coating pigment that can be fixed on printing media without the use of organic binders comprising at least one water swellable layer silicate in the amount of at least 30 weight percent based on the weight of the pigment, wherein said coating pigment has the swelling volume of about 5 to about 30 ml based on a suspension of 2 g of coating pigment in 100 ml water wherein the water swellable layer silicate is treated with up to 4 weight percent of an oligomeric or polymeric cationic agent containing quaternary nitrogen atoms in order to adjust the zeta potential within the range of about −35 to about +10 mV.

11. The coating pigment of claim 10 wherein the amount of cationic agent is about 0.5 to about 2 weight percent.

12. The coating pigment of claim 10 wherein the cationic agent is cationic starch or cationic guar.

13. The coating pigment of claim 10 wherein the cationic agent is polydiallyldimethylammonium chloride.

14. A water-based coating composition containing the coating pigment of claim 1 in the amount of about 5 to about 50 weight percent based on the weight of the coating.

15. The water-based coating composition of claim 14 wherein the coating pigment is present in the amount of about 16 to about 50 weight percent.

16. The water-based coating composition of claim 14 wherein the coating pigment is present in the amount of about 21 to about 40 weight percent.

17. A process of coating a printing medium with the water-based coating composition of claim 14 wherein the coating composition is applied at the rate of about 500 to about 2000 m/min to the printing medium.

18. A printing medium coated on one or both sides with the coating composition of claim 14.

19. The printing medium of claim 18 wherein the weight per unit area is greater than 20 g/m².

20. The printing medium of claim 18 wherein the weight per unit area is about 20 to about 40 g/m².

21. The printing medium of claim 18 wherein the weight per unit area is about 25 to about 38 g/m².

22. The printing medium of claim 18 wherein the weight of the coating pigment is about 0.5 to about 6 g/m² per side.

23. The printing medium of claim 18 wherein the weight of the coating pigment is about 1 to about 3 g/m² per side.

24. In a process for improving the deinkability of printed printing media, the improvement which comprises coating printing media on one or both sides with a coating which contains a coating pigment fixed essentially without the use of binders wherein the coating pigment contains at least one water swellable layer silicate in the amount of at least about 30 weight percent based on the weight of the coating pigment, and wherein the swelling volume of the coating pigment is about 5 to about 30 ml based on a suspension of 2 g of coating pigment in 100 ml of water, wherein said water swellable layer of silicate has a zeta potential value of about $-35$ to about $+10$ mV.

25. The process of claim 24 wherein the printing media contain about 0.5 to about 6 g/m² of coating pigment per side.

26. The process of claim 25 wherein the amount of coating pigment is about 1 to about 3 g/m² per side.

* * * * *